(12) United States Patent
Ovcharik et al.

(10) Patent No.: US 10,375,086 B2
(45) Date of Patent: Aug. 6, 2019

(54) SYSTEM AND METHOD FOR DETECTION OF MALICIOUS DATA ENCRYPTION PROGRAMS

(71) Applicant: Kaspersky Lab AO, Moscow (RU)

(72) Inventors: Vladislav I. Ovcharik, Moscow (RU); Oleg G. Bykov, Moscow (RU)

(73) Assignee: AO KASPERSKY LAB, Moscow (RU)

( * ) Notice: Subject to any disclaimer, the term of this patent is extended or adjusted under 35 U.S.C. 154(b) by 0 days.

(21) Appl. No.: 14/951,970

(22) Filed: Nov. 25, 2015

(65) Prior Publication Data

US 2017/0093886 A1 Mar. 30, 2017

(30) Foreign Application Priority Data

Sep. 30, 2015 (RU) .................................. 2015141551

(51) Int. Cl.
| | | |
|---|---|---|
| H04L 29/06 | (2006.01) | |
| H04L 9/00 | (2006.01) | |
| G06F 21/56 | (2013.01) | |

(52) U.S. Cl.
CPC ........ *H04L 63/1408* (2013.01); *G06F 21/563* (2013.01); *H04L 9/002* (2013.01);
(Continued)

(58) Field of Classification Search
CPC .................. G06F 21/566; G06F 21/602; G06F 2221/034; H04L 63/1416; H04L 63/1408; H04L 63/1441
See application file for complete search history.

(56) References Cited

U.S. PATENT DOCUMENTS 8,856,542 B2   10/2014   Tatarinov
9,514,309 B1*  12/2016   Mann ...................... G06F 21/56
(Continued)

FOREIGN PATENT DOCUMENTS

CN   101187872 A   5/2008
CN   101984550 A   3/2011
(Continued)

OTHER PUBLICATIONS

Reid Wilkes "Speed: NGen Revs Up Your Performance with Powerful New Features" MSDN Magazine, No. 4, May 8, 2009.
(Continued)

*Primary Examiner* — Samson B Lemma
*Assistant Examiner* — Arya Golriz
(74) *Attorney, Agent, or Firm* — Arent Fox LLP; Michael Fainberg

(57) ABSTRACT

A method for detection of malicious encryption programs, the method comprising: intercepting, at a server, a file operation request from a client on a file stored on the server; collecting information about at least the requested file and the requested operation; determining, by a hardware processor of the server, based on the collected information, whether the file operation request came from a known malicious encryption program; when the file operation request came from an unknown program, then calculating, by the hardware processor, entropies of at least a portion of the file before and after the execution of the requested operation on the file; and calculating, by the hardware processor, a difference between the calculated entropies; when the difference is below a threshold, allowing the requested operation on the file; and when the difference is above the threshold, denying the requested operation on the file.

18 Claims, 5 Drawing Sheets

(52) U.S. Cl.
CPC ............ *H04L 63/145* (2013.01); *G06F 21/56* (2013.01); *H04L 63/0227* (2013.01); *H04L 63/0428* (2013.01); *H04L 2209/34* (2013.01)

(56) References Cited

U.S. PATENT DOCUMENTS

| | | | |
|---|---|---|---|
| 2003/0105767 A1* | 6/2003 | Sonoda | G06F 3/0619 |
| 2003/0110391 A1 | 6/2003 | Wolff | |
| 2006/0190505 A1* | 8/2006 | DeMaio | G06F 11/1451 |
| 2006/0277226 A1* | 12/2006 | Chikusa | G06F 17/30067 |
| 2009/0007233 A1* | 1/2009 | Smith | G06F 21/6218 726/2 |
| 2009/0193113 A1* | 7/2009 | Lunde | G06F 9/5072 709/224 |
| 2010/0235392 A1* | 9/2010 | McCreight | G06F 17/30949 707/780 |
| 2012/0046972 A1* | 2/2012 | Tonti | G06F 19/321 705/3 |
| 2012/0323858 A1 | 12/2012 | Nagarkar | |
| 2013/0067576 A1* | 3/2013 | Niemela | G06F 21/568 726/24 |
| 2014/0208426 A1* | 7/2014 | Natarajan | H04L 63/1416 726/23 |
| 2015/0058987 A1* | 2/2015 | Thure | G06F 21/554 726/23 |
| 2016/0036833 A1* | 2/2016 | Ardeli | H04L 63/101 726/22 |
| 2016/0180087 A1* | 6/2016 | Edwards | G06F 21/568 726/24 |
| 2016/0292418 A1* | 10/2016 | Wojnowicz | G06F 21/565 |

FOREIGN PATENT DOCUMENTS

| | | |
|---|---|---|
| CN | 102708313 A | 10/2012 |
| CN | 104036187 A | 9/2014 |

OTHER PUBLICATIONS

European Search Report for EP 15 18 4123, dated Apr. 6, 2016.
European Search Report for EP 15 20 2318 dated Mar. 31, 2016.

* cited by examiner

SYSTEM AND METHOD FOR DETECTION OF MALICIOUS DATA ENCRYPTION PROGRAMS

CROSS-REFERENCE TO RELATED APPLICATIONS

This application claims benefit of priority under 35 U.S.C. 119(a)-(d) to a Russian Application No. 2015141551 filed on Sep. 30, 2015, which is incorporated by reference herein.

FIELD OF TECHNOLOGY

The present invention relates generally to the field of computer security, and, more specifically, to systems and methods for detecting malicious data encryption programs.

BACKGROUND

Data encryption programs (cryptors) have become popular form of malicious software, which when launched on a user's computer encrypt the most important data (such as images, text files and other files typically used by the computer user). After the encryption, the user is asked to pay the hacker money in order to get the key for decrypting his files. Given that hackers are making ever increasing use of asymmetrical encryption, it is practically impossible to restore the user's data without knowledge of the private key for decryption of the user data. An example of such encryption programs is the malicious program CryptoLocker.

The creators of antivirus applications have long known about such programs, and have developed a number of technologies able to detect encryption programs. For example, US Patent Application Pub No. 20150058987 describes an algorithm for calculating entropy to detect operation of file encryption malware. The application likewise considers excluding files based on their format type in order to reduce false alarms and increase the operating speed.

Such detection methods have proven themselves well, being able to detect an encryption malware in good time when operating on a user's computer. However, there is a problem related to the fact that, if a malicious encryption program is analyzing the drives on the user's computer on which it will then encrypt the data, if it comes upon a network drive (which resides physically on a server) the malicious program may also encrypt the data on the server. Of course, backtracking all the file activity on the server would allow this problem to be resolved, but this significantly reduces the operational productivity of the server, which is often unacceptable in a corporate environment. Thus, a new solution is needed for detecting malicious encryption programs launched from a client on a server.

SUMMARY

Disclosed are systems and method for detection of malicious encryption programs. In one exemplary aspect, a method for detection of malicious encryption programs comprising: intercepting, at a server, a file operation request from a client on a file stored on the server; collecting information about at least the requested file and the requested operation; determining, by a hardware processor of the server, based on the collected information, whether the file operation request came from a known malicious encryption program; when the file operation request came from an unknown program, then calculating, by the hardware processor, entropies of at least a portion of the file before and after the execution of the requested operation on the file; and calculating, by the hardware processor, a difference between the calculated entropies; when the difference is below a threshold, allowing the requested operation on the file; and when the difference is above the threshold, denying the requested operation on the file.

In one exemplary aspect, intercepting a request to access a file stored on the server includes, intercepting the request by a file system driver filter.

In one exemplary aspect, intercepting a request to access a file stored on the server includes, intercepting a system function call and one or more parameters of the call.

In one exemplary aspect, intercepting a request to access a file stored on the server further includes, creating at the server a backup copy of the requested file.

In one exemplary aspect, collecting information about the requested file and the requested operation includes, collecting one or more of: type of the requested file operation, and data buffers with original file contents and modified file contents.

In one exemplary aspect, when the file operation request came from a known malicious encryption program, denying the requested operation on the file.

In one exemplary aspect, calculating entropies of at least a portion of the file includes, calculating entropies of at least portions of file headers before and after the execution of the requested operation on the file.

In another exemplary aspect, a system for detection of malicious encryption programs comprises: a server having a hardware processor configured to intercept a file operation request from a client on a file stored on the server; collect information about at least the requested file and the requested operation; determine based on the collected information, whether the file operation request came from a known malicious encryption program; when the file operation request came from an unknown program, then calculate entropies of at least a portion of the file before and after the execution of the requested operation on the file; and calculate a difference between the calculated entropies; when the difference is below a threshold, allow the requested operation on the file; and when the difference is above the threshold, deny the requested operation on the file.

In yet another exemplary aspect, a non-transitory computer readable medium storing computer executable instructions for detection of malicious encryption programs, includes instructions for: intercepting, at a server, a file operation request from a client on a file stored on the server; collecting information about at least the requested file and the requested operation; determining, based on the collected information, whether the file operation request came from a known malicious encryption program; when the file operation request came from an unknown program, then calculating entropies of at least a portion of the file before and after the execution of the requested operation on the file; and calculating a difference between the calculated entropies; when the difference is below a threshold, allowing the requested operation on the file; and when the difference is above the threshold, denying the requested operation on the file.

The above simplified summary of example aspects of the invention serves to provide a basic understanding of the invention. This summary is not an extensive overview of all contemplated aspects, and is intended to neither identify key or critical elements of all aspects nor delineate the scope of any or all aspects of the invention. Its sole purpose is to present one or more aspects in a simplified form as a prelude to the more detailed description of the invention that follows. To the accomplishment of the foregoing, the one or more aspects of the present invention include the features described and particularly pointed out in the claims.

BRIEF DESCRIPTION OF THE DRAWINGS

The accompanying drawings, which are incorporated into and constitute a part of this specification, illustrate one or more example aspects of the present invention and, together with the detailed description, serve to explain their principles and implementations.

DETAILED DESCRIPTION OF EXEMPLARY ASPECTS OF THE INVENTION

Example aspects of the present invention are described herein in the context of a system, method, and computer program product for detection of malicious encryption programs. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
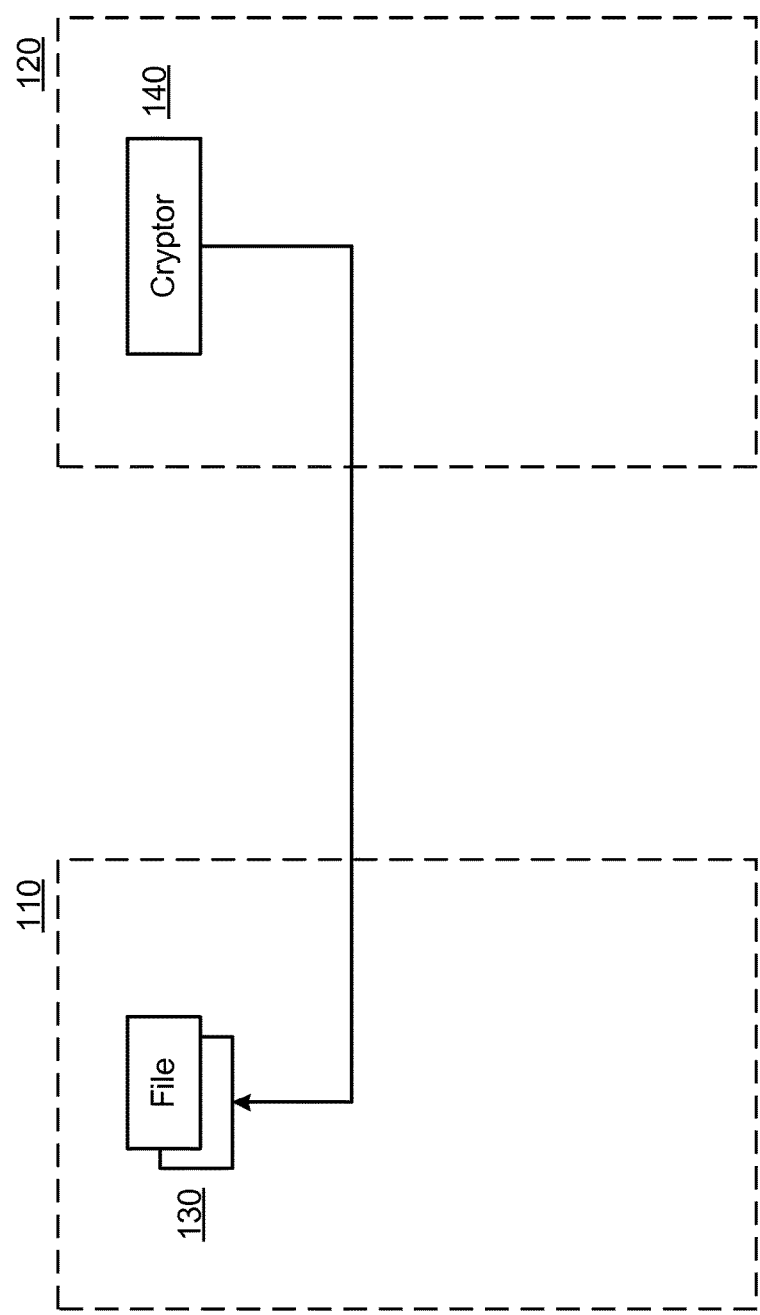
FIG. 1 illustrates an example of operation of a malicious encryption program at the server site.

FIG. 1 shows example of operation of a malicious encryption program at the server site. A malicious encryption program 140 is launched on a user's computer 120. This can be done by the user himself, believing the program 140 to be a clean program, or the program 140 may launch itself, for example, at the startup of the computer 120 through a registry key used for autostart. If the network drive on the server 110 is connected from the computer 120, the encryption program 140 can also encrypt files 130 on the network drive of the server 110.

Figure 2:
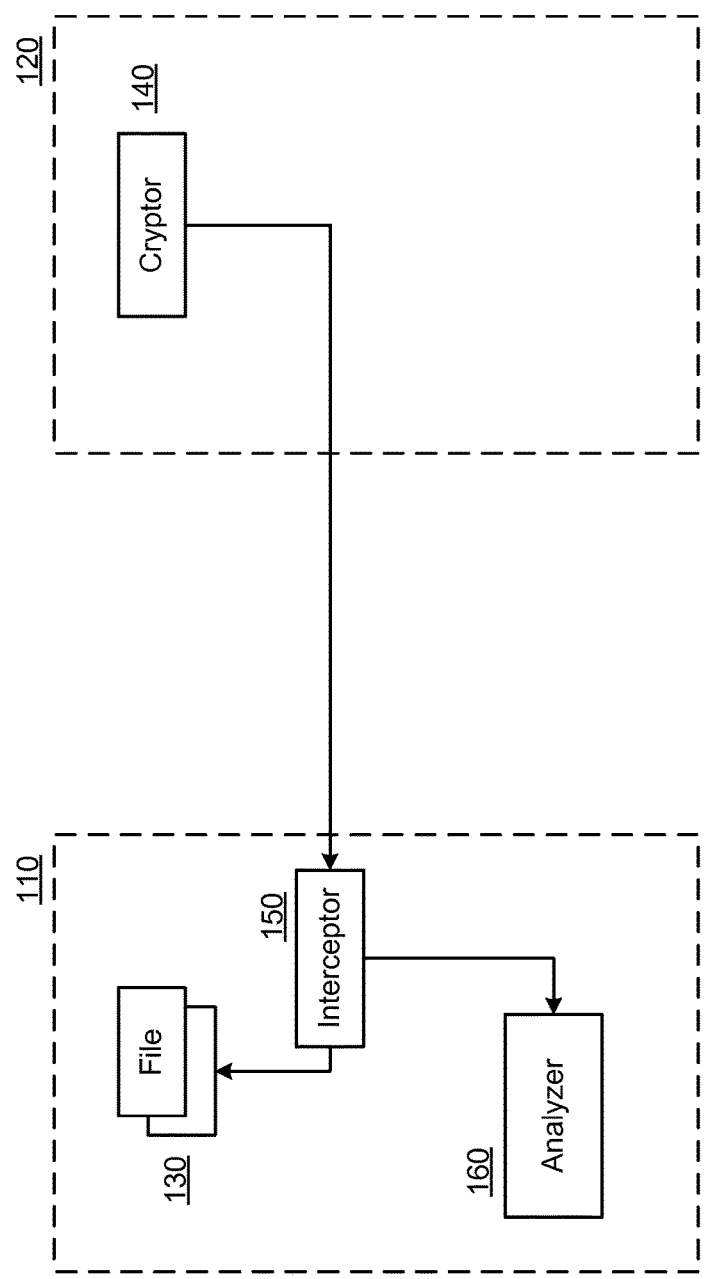
FIG. 2 illustrates an exemplary system for detection of malicious encryption programs.

FIG. 2 shows an exemplary system for detection of malicious encryption programs. As compared to FIG. 1, the system further includes an interceptor 150 and an analyzer 160. In one exemplary aspect, the interceptor 150 may be a file filter driver, and the analyzer 160 may be an antivirus application, such as Kaspersky Lab Antivirus. The interceptor 150 intercepts requests for accessing files 130 and sends the data to the analyzer 160. In one exemplary aspect, the intercepting of file access requests may include interception of such system function calls as CreateFile, ReadFile/WriteFile, DeleteFile, GetFileInformationByHandle, FindFirstFile and others (this list of functions is applicable to the Windows operating system).

In order to detect the actual execution of the malicious encryption program 140, it is desirable to intercept not only a system function call, but also data which this function tries to write in place of the original file 130. It should be noted that malicious encryption programs 140 can generally work according to two algorithms for the encrypting of files 130: first, they can create a copy of the file 130 and encrypt its data into the created copy, after which the original file 130 is deleted; second, they can directly overwrite the data of the file 130, reading the original data into a buffer, encrypting it, and then rewriting it.

Figure 4:
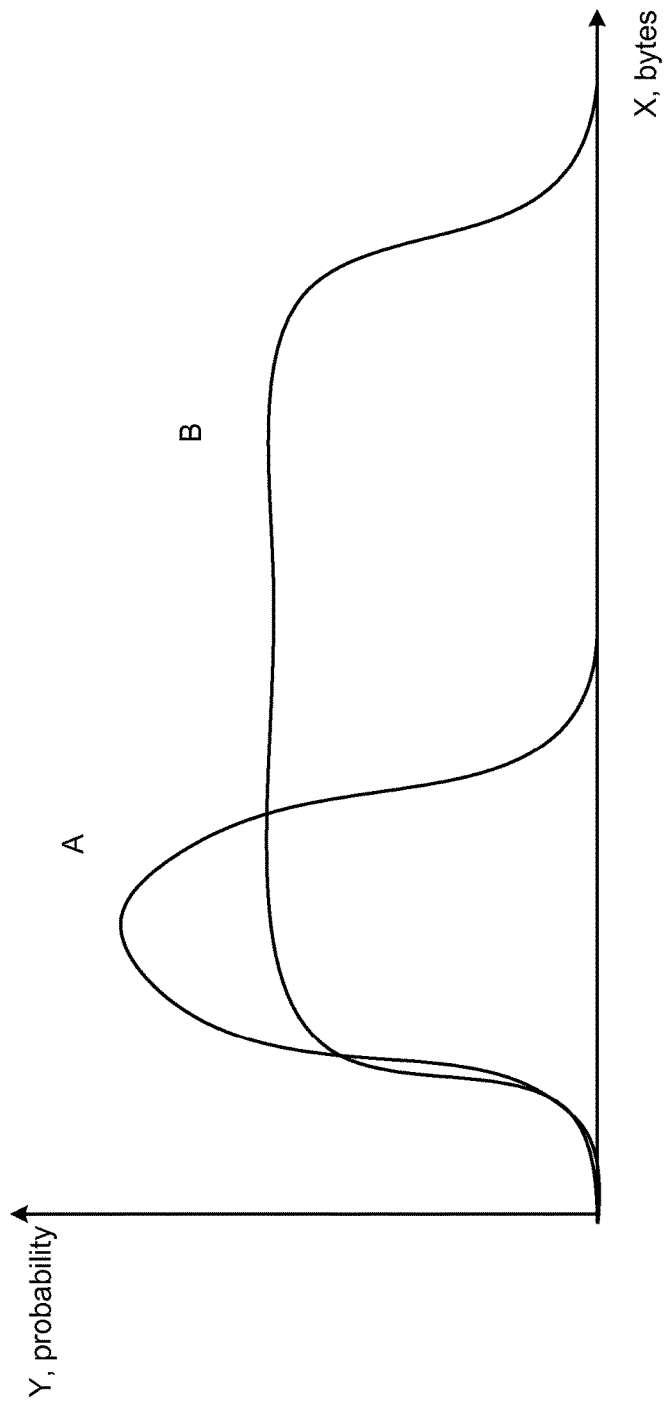
FIG. 4 illustrates a probability function according to one exemplary aspect.

In the context of the present invention, a known approach of calculating entropy when data is written to a drive may be used to detect the execution of malicious encryption program 140. The definition of informational entropy (hereinafter, simply entropy) is given in the article The Mathematical Theory of Communication, (c) 1949 by the Board of Trustees of the University of Illinois. FIG. 4 shows an example of the calculation of entropy for one and the same file before and after its encryption. Along the X axis are plotted the bytes (such as the characters a, b, c and so on), and along the Y axis the probability of their occurrence in a file. A characteristic graph—the probability function—determines the probability of appearance of a character (byte) in a file. Entropy shows how many bits are needed to encode this information (character). Thus, the less information in the file, the greater the entropy. For example, for a text file where there were only English characters, the entropy will be less than after its encryption (encrypted text looks like mixture of random characters).

The probability function A in FIG. 4 is characteristic for an unencrypted file, where a limited set of characters has the greatest probability of occurrence—this is true for text files, and also for headers of binary files, since the header describes the type (format) of the file. After the file is encrypted by the encryption program 140 the probability function takes on the form of function B, where a different number of characters will occur with approximately identical frequency.

One of the known method for detection of an encryption program 140 is to calculate the "convergence" of entropy, that is, the difference between two entropies. If the "convergence" (hereafter used without quotation marks) is greater than a certain threshold, then it is definite that the file has been changed (e.g., encrypted). The maximum convergence value is equal to several dozen bytes. The convergence can be calculated using the formula:

$$P = \|H_{modified} - H_{original}\|$$

Where P is the convergence value in bytes, $H_{modified}$ is the entropy value after the changing of the file (encryption), $H_{original}$ is the entropy value before changing the file.

Figure 3:
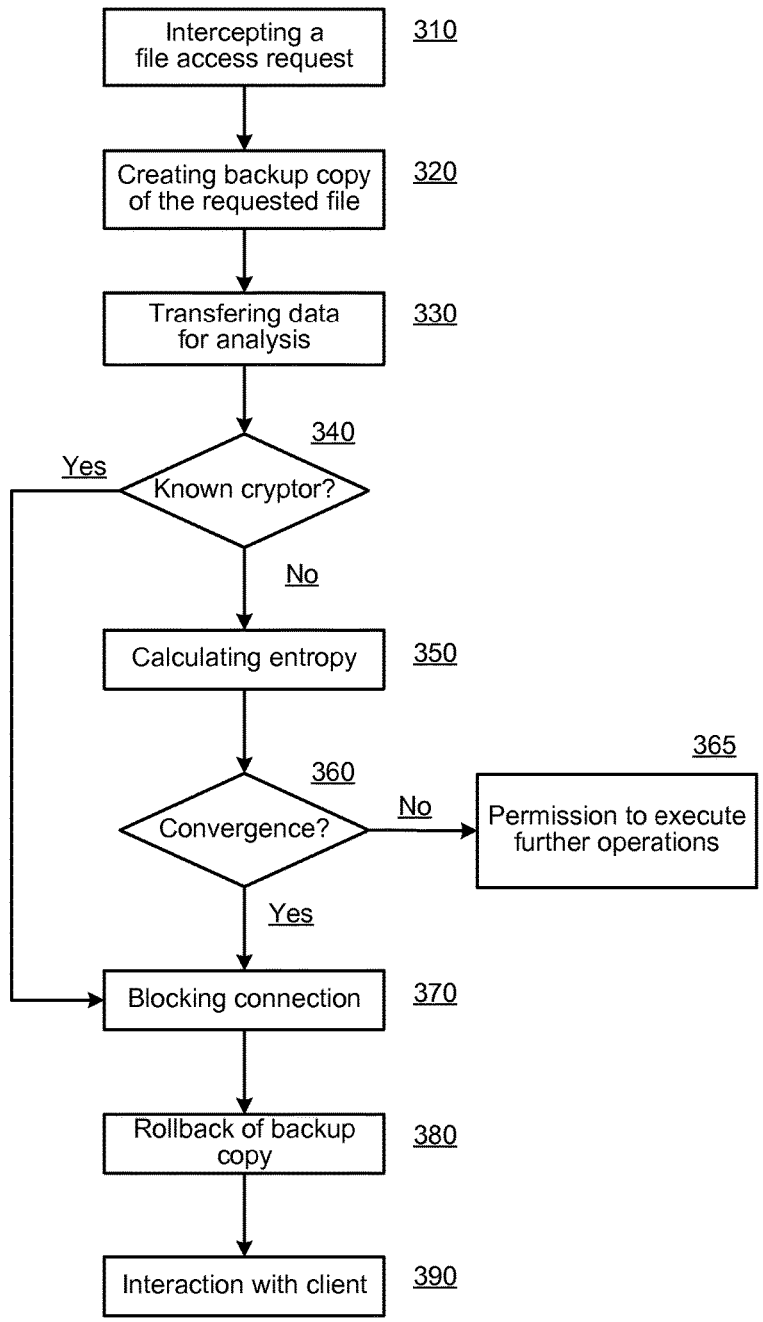
FIG. 3 illustrates an exemplary method for detection of malicious encryption programs.

FIG. 3 illustrates an exemplary method for detection of malicious encryption programs. In step 310, a file operation (request to access the file) is intercepted from the user's computer 120 on the server 110. In step 320, a backup copy of the file is created, which is subjected to the change. In one exemplary aspect, the creation of the backup file copy can be realized by copying the file into the same directory (or a temporary directory for storing backup copies). An example of an application that performs backup copying is Acronis Backup & Recovery.

In step 330, information about the intercepted file operation is dispatched for analysis to the analyzer 160. The data may include, but not limited to: the type of file operation (e.g., the API function called), the data buffers (with original file content and modified content), and data about the user's computer 120. In step 340, the buffer of the data which will be written into the file 130 are analyzed. If it is determined that, based on the results of the analysis of the data buffer, a known encryption program 140 is attempting to carry out the requested file operation, then in step 370 the connection between the user's computer 120 and the server 110 is blocked or closed. The further steps will be discussed below.

But if no known encryption program 140 was detected based on the analysis of the data, in step 350, the analyzer 160 calculates entropy of the overwritten file segment and calculates convergence for the entropy of the original and the overwritten file segment. In one exemplary aspect, the analyzer 160 may analyze the file header, which includes the description of the format (type) of the file 130. When the file is encrypted the file header is overwritten, which results in a change in the file format (loss thereof). As a rule, the first few kilobytes of the file are sufficient for such an analysis. This analysis is performed in step 360 and, if the convergence does not exceed a given threshold, then in step 365 the further file operations on the part of the user's computer 120 are allowed.

If the convergence of entropy exceeds the given threshold, the analyzer 160 concludes that encryption program 140 is executing on the user's computer 120, and in step 370 blocks (or breaks) the connection between the user's computer 120 and the server 110. In step 380, the backup copy of the file is restored (rollback) on the server 110.

It is important to note that the execution of file operations on the part of the user's computer 120 is not blocked, and they are executed without delay on the part of the analyzer 160—so-called asynchronous operation. On the other hand, the execution of file operations occurs without loss of productivity, but this requires the creation of backup copies, since the original file is partly overwritten (encrypted) during asynchronous operation.

In step 390, an interaction occurs between the analyzer 160 and the user's computer 120. In this case, if an antivirus application (not shown) has been installed on the user's computer 120, the analyzer 160 can obtain from it information about the process (the name of the process, how long the process is working, the hash sum of the file from which the process was launched, the presence of a digital signature, and so on) which is now working with the files 130 on the server 110. In one exemplary aspect, the CIFS protocol (Common Internet File System) may be used for this purpose.

We shall present an example of the interaction between the analyzer 160 and the antivirus application on the user's computer 120. After the interception by the interceptor 150 of the file operation from the user's computer 120 on the server 110 and after obtaining a verdict from the analyzer 160 as to the actual execution of the encryption program 140, information about the process which is encrypting the files 130 is sent to the antivirus application at the user's computer 120. As an example, the information may include:

The name of the process: winserv.exe

Presence of a digital signature: no

Based on the information obtained, the antivirus application on the user's computer 120 starts a search for the process with the indicated name winserv.exe among all processes launched in the system, and after finding it, the antivirus application stops the found process and removes the file from which it was launched.

In yet another exemplary aspect, the files 130 are stored not on the server 110, but on a network data storage system (NAS, Network Attached Storage, not shown in FIG. 2), which is connected to the server 110. A peculiarity of working with a network data storage system is that it requires an extension (or support) of a data exchange protocol between it and the server 110. In one exemplary aspect, the ICAP (Internet Content Adaptation Protocol) protocol extension may be required.

Figure 5:
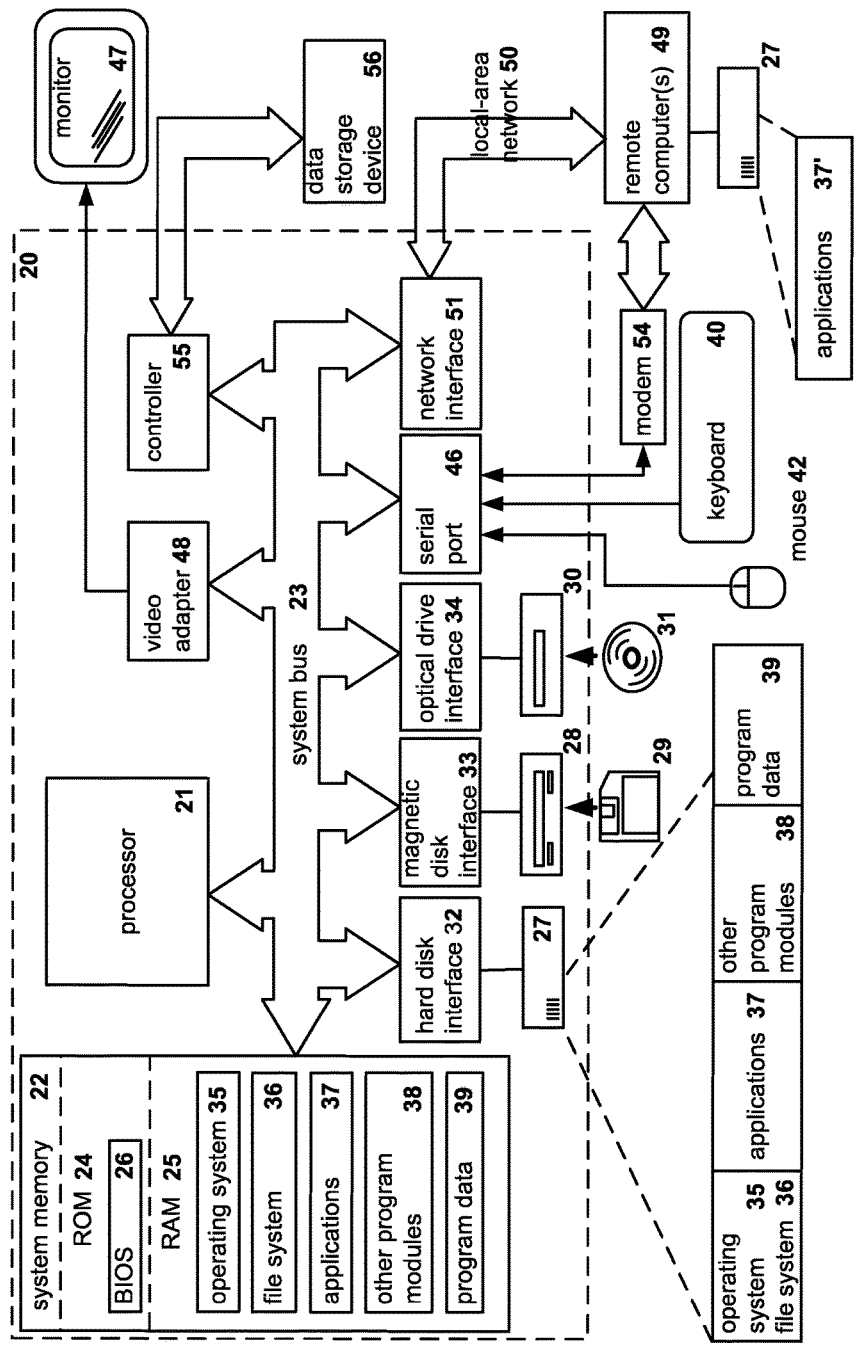
FIG. 5 illustrates an example of a computer system which can be used to implement various aspects of systems and methods of the present invention.

FIG. 5 illustrates an example of a general-purpose computer system (which may be a personal computer or a server) on which the disclosed systems and method can be implemented. As shown, the computer system includes a central processing unit 21, a system memory 22 and a system bus 23 connecting the various system components, including the memory associated with the central processing unit 21. The system bus 23 is realized like any bus structure known from the prior art, containing in turn a bus memory or bus memory controller, a peripheral bus and a local bus, which is able to interact with any other bus architecture. The system memory includes permanent memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to operate in a network environment, using a network connection to one or more remote computers 49. The remote computer (or computers) 49 are also personal computers or servers having the majority or all of the aforementioned elements in describing the nature of a personal computer 20. Other devices can also be present in the computer network, such as routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer (such as the one described in greater detail in FIG. 5 above). Accordingly, each module can be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for detection of malicious encryption programs, the method comprising:
intercepting a file operation request from a client device on a file stored on a server;
responsive to intercepting the file operation request, creating and saving a backup copy of the file at the server;
collecting information about at least the client device, the requested file and the file operation request, wherein the collected information includes data buffers with original contents of the file and data that the file operation request is attempting to write in place of the file;
determining based on the collected information, whether a known malicious encryption program has been launched on the client device to attempt an execution of the file operation request on the server;
when the file operation request came from an unknown encryption program, calculating, by a hardware processor, a difference between a first entropy of a header of the file before the execution of the file operation request and a second entropy of a header of the data that the file operation request is attempting to write in place of the file;
when the difference is below a threshold, allowing the file operation request of the unknown encryption program on the file to be performed on the server and deleting the backup copy of the file, otherwise blocking a connection between the client device and the server and restoring the backup copy of the file at the server; and
sending information about the unknown encryption program to a component on the client device, the information comprising a name of a process executing the program, wherein the component is enabled to search and stop the process on the client device initiating the file operation request based on a reception of the information.

2. The method of claim 1, wherein intercepting a request to access a file stored on the server includes, intercepting the request by a file system driver filter.

3. The method of claim 1, wherein intercepting a request to access a file stored on the server includes, intercepting a system function call and one or more parameters of the call.

4. The method of claim 1, wherein collecting information about the requested file and the file operation request further includes, collecting one or more of: type of the file operation request, and an application programming interface (API) function called.

5. The method of claim 1, wherein, when the file operation request came from a known malicious encryption program, denying the file operation request on the file.

6. The method of claim 1, wherein calculating entropies of at least a portion of the file includes, calculating entropies of at least portions of file headers before and after the execution of the requested operation on the file.

7. A system for detection of malicious encryption programs, the system comprising:
a server having a hardware processor configured to:
intercept a file operation request from a client device on a file stored on the server;
responsive to intercepting the file operation request, create and save a backup copy of the file at the server;
collect information about at least the client device, the requested file and the file operation request, wherein the collected information includes data buffers with original contents of the file and data that the file operation request is attempting to write in place of the file;
determine based on the collected information, whether a known malicious encryption program has been launched on the client device to attempt an execution of the file operation request on the server;
when the file operation request came from an unknown encryption program, calculate a difference between a first entropy of a header of the file before the execution of the file operation request and a second entropy of a header of the data that the file operation request is attempting to write in place of the file;
when the difference is below a threshold, allow the file operation request of the encryption program on the file to be performed on the server and deleting the backup copy of the file, otherwise: block a connection between the client device and the server and restore the backup copy of the file at the server; and
send information about the unknown encryption program to a component on the client device, the information comprising a name of a process executing the program, wherein the component is enabled to search and stop the process on the client device initiating the file operation request based on a reception of the information.

8. The system of claim 7, wherein, to intercept the request to access a file stored on the server, the processor is further configured to intercept the request by a file system driver filter.

9. The system of claim 7, wherein, to intercept the request to access a file stored on the server, the processor is further configured to intercept a system function call and one or more parameters of the call.

10. The system of claim 7, wherein, to collect the information about the requested file and the file operation request, the processor is further configured to collect one or more of: type of the file operation request, and an application programming interface (API) function called.

11. The system of claim 7, wherein the processor is further configured to deny the file operation request on the file when the file operation request came from a known malicious encryption program.

12. The system of claim 7, wherein, to calculate the entropies of at least a portion of the file, the processor is further configured to calculate entropies of at least portions of file headers before and after the execution of the requested operation on the file.

13. A non-transitory computer readable medium storing computer executable instructions for detection of malicious encryption programs, including instructions for:
intercepting a file operation request from a client device on a file stored on a server;
responsive to intercepting the file operation request, creating and saving a backup copy of the file at the server;
collecting information about at least the client device, the requested file and the requested operation, wherein the collected information includes data buffers with original contents of the file and data that the file operation request is attempting to write in place of the file;
determining, based on the collected information, whether a known malicious encryption program has been launched on the client device to attempt an execution of the file requested operation on the server;
when the file operation request came from an unknown encryption program, calculating a difference between a first entropy of a header of the file before the execution of the requested operation and a second entropy of a header of the data that the file operation request is attempting to write in place of the file;
when the difference is below a threshold, allowing the requested operation of the encryption program on the file to be performed on the server and deleting the backup copy of the file, otherwise: blocking a connection between the client device and the server and restoring the backup copy of the file at the server; and
sending information about the unknown encryption program to a component on the client device, the information comprising a name of a process executing the program, and wherein the component is enabled to search and stop the process on the client device initiating the file operation request based on a reception of the information.

14. The non-transitory computer readable medium of claim 13, wherein intercepting a request to access a file stored on the server includes, intercepting the request by a file system driver filter.

15. The non-transitory computer readable medium of claim 13, wherein intercepting a request to access a file stored on the server includes, intercepting a system function call and one or more parameters of the call.

16. The non-transitory computer readable medium of claim 13, wherein collecting information about the requested file and the file operation request includes, collecting one or more of: type of the requested file operation request, and an application programming interface (API) function called.

17. The non-transitory computer readable medium of claim 13, wherein, when the file operation request came from a known malicious encryption program, denying the file operation request on the file.

18. The non-transitory computer readable medium of claim 13, wherein calculating entropies of at least a portion of the file includes, calculating entropies of at least portions of file headers before and after the execution of the requested operation on the file.

* * * * *